(12) United States Patent
Hoh et al.

(10) Patent No.: US 12,258,023 B2
(45) Date of Patent: Mar. 25, 2025

(54) METHODS AND SYSTEMS FOR AUTONOMOUS PATH PLANNING TRIGGERED BY FREEWAY RUBBERNECKING

(71) Applicants: Toyota Motor Engineering & Manufacturing North America, Inc., Plano, TX (US); McMaster University, Hamilton (CA)

(72) Inventors: Baik Hoh, Mountain View, CA (US); Seyhan Ucar, Mountain View, CA (US); Kentaro Oguchi, Mountain View, CA (US); Hao Yang, Hamilton (CA)

(73) Assignees: TOYOTA MOTOR ENGINEERING & MANUFACTURING NORTH AMERICA, INC., Plano, TX (US); MCMASTER UNIVERSITY, Hamilton (CA)

( * ) Notice: Subject to any disclaimer, the term of this patent is extended or adjusted under 35 U.S.C. 154(b) by 165 days.

(21) Appl. No.: 17/210,798

(22) Filed: Mar. 24, 2021

(65) Prior Publication Data

US 2022/0306122 A1    Sep. 29, 2022

(51) Int. Cl.

| | |
|---|---|
| *B60W 40/08* | (2012.01) |
| *B60W 30/14* | (2006.01) |
| *B60W 30/18* | (2012.01) |
| *B60W 40/09* | (2012.01) |
| *B60W 60/00* | (2020.01) |
| *G05D 1/00* | (2024.01) |
| *G06V 20/59* | (2022.01) |

(Continued)

(52) U.S. Cl.
CPC .......... *B60W 40/08* (2013.01); *B60W 30/143* (2013.01); *B60W 30/18163* (2013.01); *B60W 40/09* (2013.01); *B60W 60/005* (2020.02); *G05D 1/0287* (2013.01); *G05D 1/0293* (2013.01); *G06V 20/59* (2022.01); *G06V 20/597* (2022.01); *G08G 1/052* (2013.01); *G08G 1/16* (2013.01); *B60W 2420/403* (2013.01); *B60W 2520/10* (2013.01); *B60W 2540/225* (2020.02)

(58) Field of Classification Search
None
See application file for complete search history.

(56) References Cited

U.S. PATENT DOCUMENTS

| | | | |
|---|---|---|---|
| 6,111,539 | A | 8/2000 | Mannings et al. |
| 7,212,907 | B2 | 5/2007 | Heinrichs |
| 9,454,150 | B2 | 9/2016 | Uehara |

(Continued)

*Primary Examiner* — Fadey S. Jabr
*Assistant Examiner* — Mario C Gonzalez
(74) *Attorney, Agent, or Firm* — Dinsmore & Shohl LLP

(57) ABSTRACT

A method for autonomous path planning triggered by freeway rubbernecking includes obtaining gaze directions of drivers of a plurality of connected vehicles in a region of a road. The method also includes determining whether an average speed of the plurality of connected vehicles in the region is less than a predetermined speed. The method further includes controlling mobility of one or more of the plurality of connected vehicles in response to determining that the gaze directions of one or more drivers of the plurality of connected vehicles deviate from the moving direction of the connected vehicles and determining that the average speed of the connected vehicles is less than the predetermined speed.

20 Claims, 8 Drawing Sheets

(51) Int. Cl.
*G08G 1/052* (2006.01)
*G08G 1/16* (2006.01)

(56) References Cited

U.S. PATENT DOCUMENTS

| | | | |
|---|---|---|---|
| 10,074,271 B1* | 9/2018 | Gubarev | G08G 1/0129 |
| 10,573,061 B2 | 2/2020 | Sun et al. | |
| 10,816,993 B1 | 10/2020 | Tran | |
| 2013/0124012 A1* | 5/2013 | Shida | G08G 1/08 |
| | | | 701/2 |
| 2013/0138320 A1 | 5/2013 | Aso | |
| 2017/0327116 A1* | 11/2017 | Heo | B60W 30/18018 |
| 2017/0352262 A1* | 12/2017 | Xu | G08G 1/0133 |
| 2019/0051159 A1* | 2/2019 | Wang | G05D 1/0088 |
| 2019/0276033 A1* | 9/2019 | Fung | G06V 10/764 |
| 2020/0143672 A1* | 5/2020 | Ashida | G08G 1/0145 |
| 2021/0118293 A1* | 4/2021 | Yi | G08G 1/0133 |
| 2022/0139093 A1* | 5/2022 | Shimotani | G06V 20/59 |
| | | | 382/103 |
| 2022/0274621 A1* | 9/2022 | Ota | B60W 50/14 |

* cited by examiner

METHODS AND SYSTEMS FOR AUTONOMOUS PATH PLANNING TRIGGERED BY FREEWAY RUBBERNECKING

TECHNICAL FIELD

The present disclosure relates to a traffic management system, and more particularly, to methods and systems for autonomous path planning triggered by freeway rubbernecking.

BACKGROUND

Rubbernecking is the act of staring at something of interest, typically associated with one's curiosity for the happenings of another. When it comes to driving, rubbernecking is often the cause of traffic congestion. As drivers slow down to see something on the other side of a road or highway, often the scene of a collision, the drivers approaching the scene also have to slow down, creating a chain reaction of vehicles slowing down as they approach the scene. In addition, sudden deceleration caused by rubbernecking may cause secondary collisions.

Current systems exist to mitigate the traffic impact of rubbernecking. For instance, incident screens have been designed that can be erected around the scenes of collisions to block a passing driver's view of the collision. However, these screens are not flexible and cannot prevent rubbernecking in real-time. In addition, spatiotemporal analyses of traffic congestion caused by rubbernecking at freeway accidents determine the capacity drop caused by rubbernecking when observing accidents in the opposite direction and estimate the delay caused by the rubbernecking. However, these analyses may be time consuming and do not present control strategies to deal with the rubbernecking phenomenon.

Therefore, alternative methods for preventing, in real-time, traffic congestion and potential collisions caused by rubbernecking are desired.

SUMMARY

According to one embodiment of the present disclosure, a method may include obtaining gaze directions of drivers of a plurality of connected vehicles in a region of a road, determining whether an average speed of the plurality of connected vehicles in the region is less than a predetermined speed, and controlling mobility of one or more of the plurality of connected vehicles in response to determining that the gaze directions of one or more drivers of the plurality of connected vehicles deviate from the moving direction of the connected vehicles and determining that the average speed of the connected vehicles is less than the predetermined speed.

According to another embodiment of the present disclosure, a system may include a controller programmed to obtain gaze directions of drivers of a plurality of connected vehicles in a region of a road, determine whether an average speed of the plurality of connected vehicles in the region is less than a predetermined speed, and control mobility of one or more of the plurality of connected vehicles in response to determining that the gaze directions of one or more drivers of the plurality of connected vehicles deviate from the moving direction of the connected vehicles and determining that the average speed of the connected vehicles is less than the predetermined speed.

According to another embodiment of the present disclosure, a non-transitory computer readable medium comprises machine readable instructions that cause a controller to, at least, obtain gaze directions of drivers of a plurality of connected vehicles in a region of a road, determine whether an average speed of the plurality of connected vehicles in the region is less than a predetermined speed, and control mobility of one or more of the plurality of connected vehicles in response to determining that the gaze directions of one or more drivers of the plurality of connected vehicles deviate from the moving direction of the connected vehicles and determining that the average speed of the connected vehicles is less than the predetermined speed.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Rubbernecking is the act of staring at something of interest, typically associated with one's curiosity for the happenings of another. When it comes to driving, rubbernecking is often the cause of traffic congestion. As drivers slow down to see something on the other side of a road or highway, often the scene of a collision, the drivers approaching the scene also have to slow down, creating a chain reaction of vehicles slowing down as they approach the scene, as illustrated among other things in FIG. 4. In addition, sudden deceleration caused by rubbernecking may cause secondary collisions in the rubbernecking lane.

Figure 4:
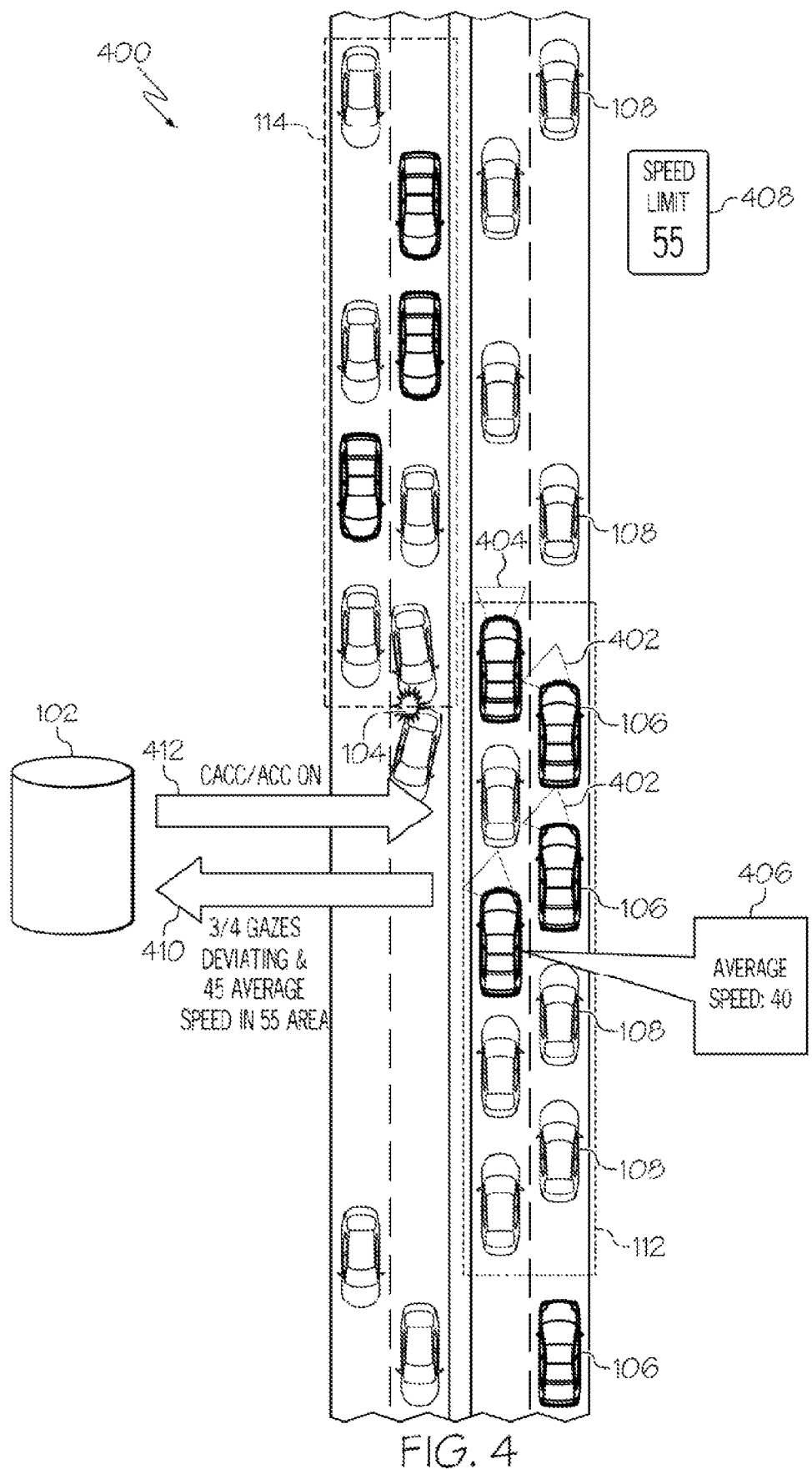
FIG. 4 depicts a connected vehicle reporting traffic conditions and a server directing connected vehicles in a rubbernecking region to activate cooperative adaptive cruise control (CACC)/adaptive cruise control (ACC), according to one or more embodiments shown and described herein.
Figure 8:
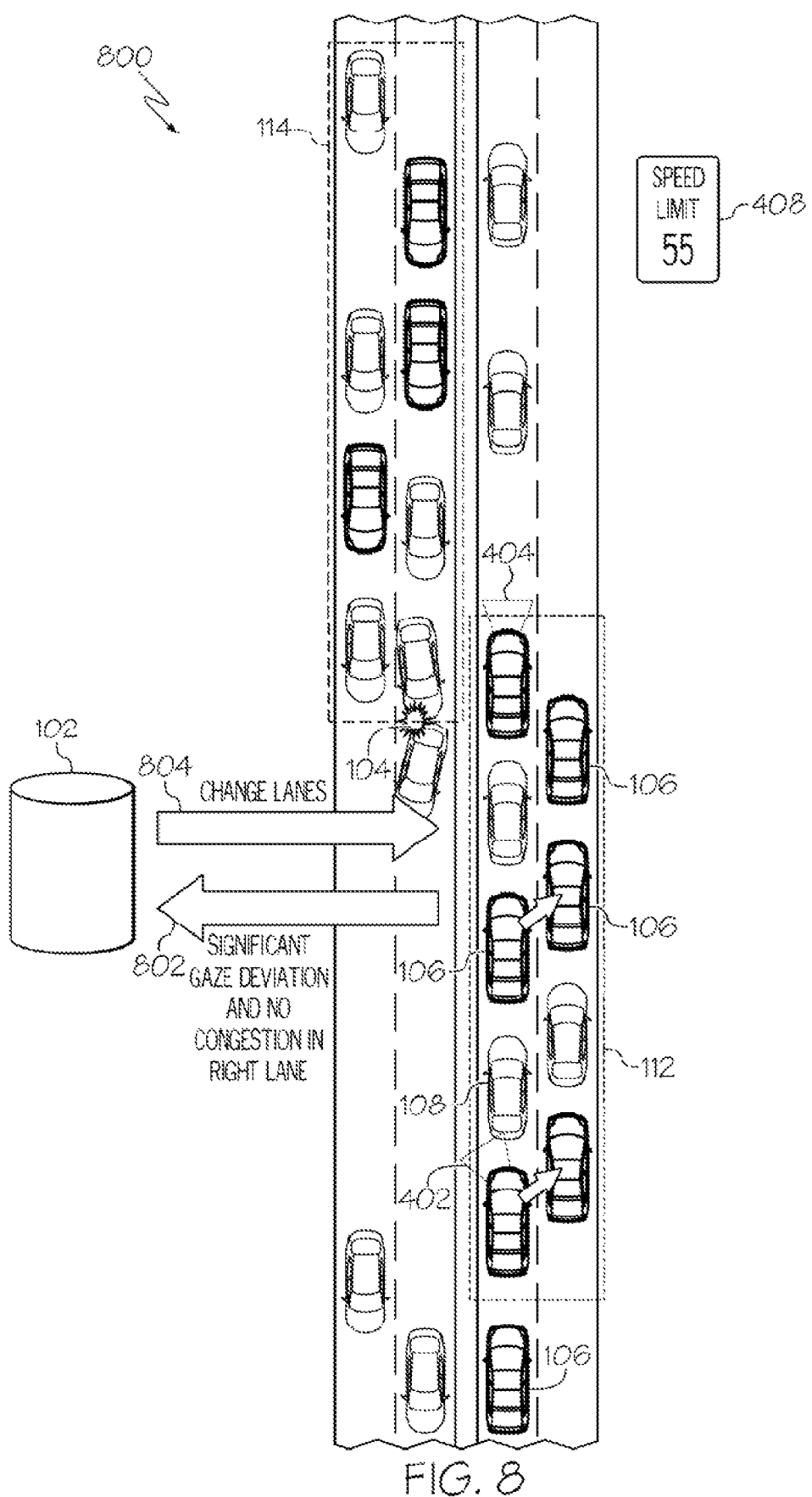
FIG. 8 depicts a connected vehicle reporting traffic conditions and a server directing connected vehicles in a rubbernecking region to change lanes, according to one or more embodiments shown and described herein.

Intelligent vehicle features, such as autonomous driving, adaptive cruise control (ACC), and cooperative adaptive cruise control (CACC), allow a vehicle to navigate a road with minimal assistance from its driver. They may also allow the vehicle to coordinate its navigation with other vehicles on the road. If a vehicle with such features can detect or gather sufficient data to allow for the detection of increased traffic congestion due to rubbernecking, the vehicles can utilize these intelligent features to coordinate with other vehicles to thereby mitigate the effects of rubbernecking. For example, upon detection of increased traffic congestion due to rubbernecking, vehicles may activate ACC/CACC, as illustrated in FIG. 4. Upon detection of increased traffic congestion due to rubbernecking, a vehicle may also move itself into another lane where there are fewer vehicles, as illustrated in FIG. 8. A vehicle may also increase the level of autonomous driving to maintain proper driving while the driver is distracted. The systems may utilize vehicle-to-vehicle (V2V), vehicle-to-everything (V2X), or other forms of communications to facilitate such coordination. Accordingly, disclosed herein are alternative methods for preventing, in real-time, traffic congestion and potential collisions caused by rubbernecking.

Figure 1:
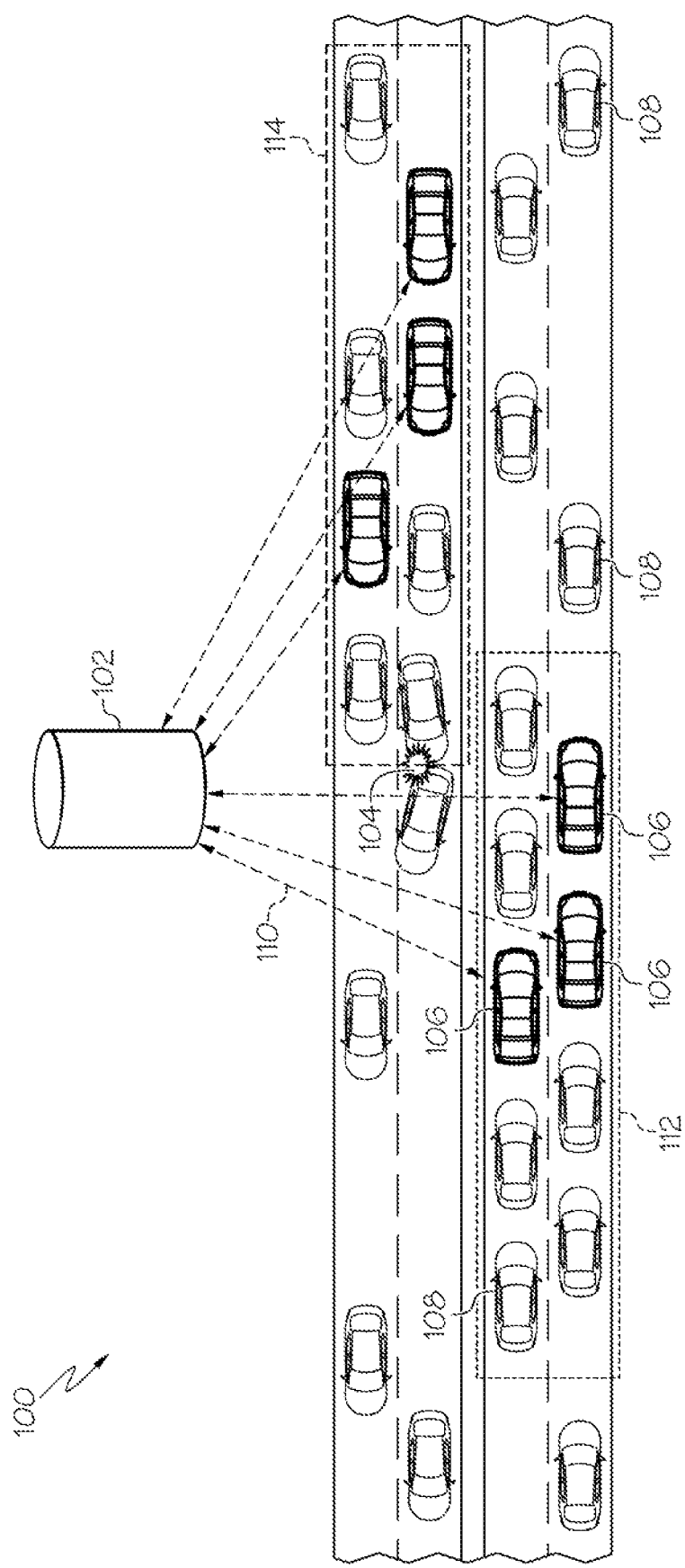
FIG. 1 depicts an example system for controlling vehicle traffic, according to one or more embodiments shown and described herein.

Referring now to FIG. 1, an example system 100 for controlling vehicle traffic is depicted. The system 100 may include a server 102, a distracting event 104, connected vehicles 106, non-connected vehicles 108, wireless connectivity 110, a rubbernecking region 112, and a congestion region 114.

In some embodiments, the system 100 may utilize V2V communications, in which case the server 102 is not necessary. In other embodiments, the system 100 may utilize V2X communication, in which case the server 102 coordinates with the vehicles. In other embodiments, the system 100 may utilize some combination of V2V, V2X, or other forms of communications, in which case server 102 may assist the vehicles in coordinating with one another.

The server 102 is a computing device that may be positioned remotely from any roads and/or vehicles. The server 102 may be a moving server, such as another vehicle, a cloud-based server, or any other type of computing device. As illustrated, the server 102 is a cloud-based server. The server 102 may be communicatively coupled to the connected vehicles 106 via wireless connectivity 110. In some embodiments, the server 102 may be a local server including, but not limited to, a roadside unit, an edge server, and the like.

Each of the connected vehicles 106 and the non-connected vehicles 108 may be a vehicle including an automobile or any other passenger or non-passenger vehicle such as, for example, a terrestrial, aquatic, and/or airborne vehicle. In some embodiments, one or more of the connected vehicles 106 and the non-connected vehicles 108 may be an unmanned aerial vehicle (UAV), commonly known as a drone.

Connected vehicles 106 are vehicles that contain one or more driving assist components (e.g., autonomous driving, CACC, etc.) and one or more radios to communicate with other vehicles and/or infrastructure. Connected vehicles 106 may establish wireless connectivity 110 with server 102 and/or with other connected vehicles 106. Non-connected vehicles 108 may not have functionalities of communicating with the server 102 or other vehicles. The vehicles 106 and 108 may be unrelated to each other. That is, the owners and/or drivers of the vehicles 106 and 108 need not know each other or plan ahead to initiate communication. Additionally, the system 100 allows rubbernecking mitigation to be established at any time, even while vehicles 106 and 108 are driving. Furthermore, 6 connected vehicles 106 and many more non-connected vehicles 108 are shown. However, it should be understood that any number of connected and non-connected vehicles may be included.

The road of system 100 is a multi-directional roadway where one direction contains a distracting event 104 (e.g., collision, construction, etc.) and a congestion region 114. Connected vehicles 106 within the congestion region 114 confirm that the distracting event 104 is indeed causing distraction to drivers. Another direction of the roadway contains a rubbernecking region 112, where connected vehicles 106 monitor rubbernecking and the traffic condition of the rubbernecking region 112. In some embodiments, the road of system 100 may not include the congestion region 114, and the distracting event 104 may be on the shoulder of the rubbernecking region 112 or on the sidewalk next to the rubbernecking region 112.

Figure 2:
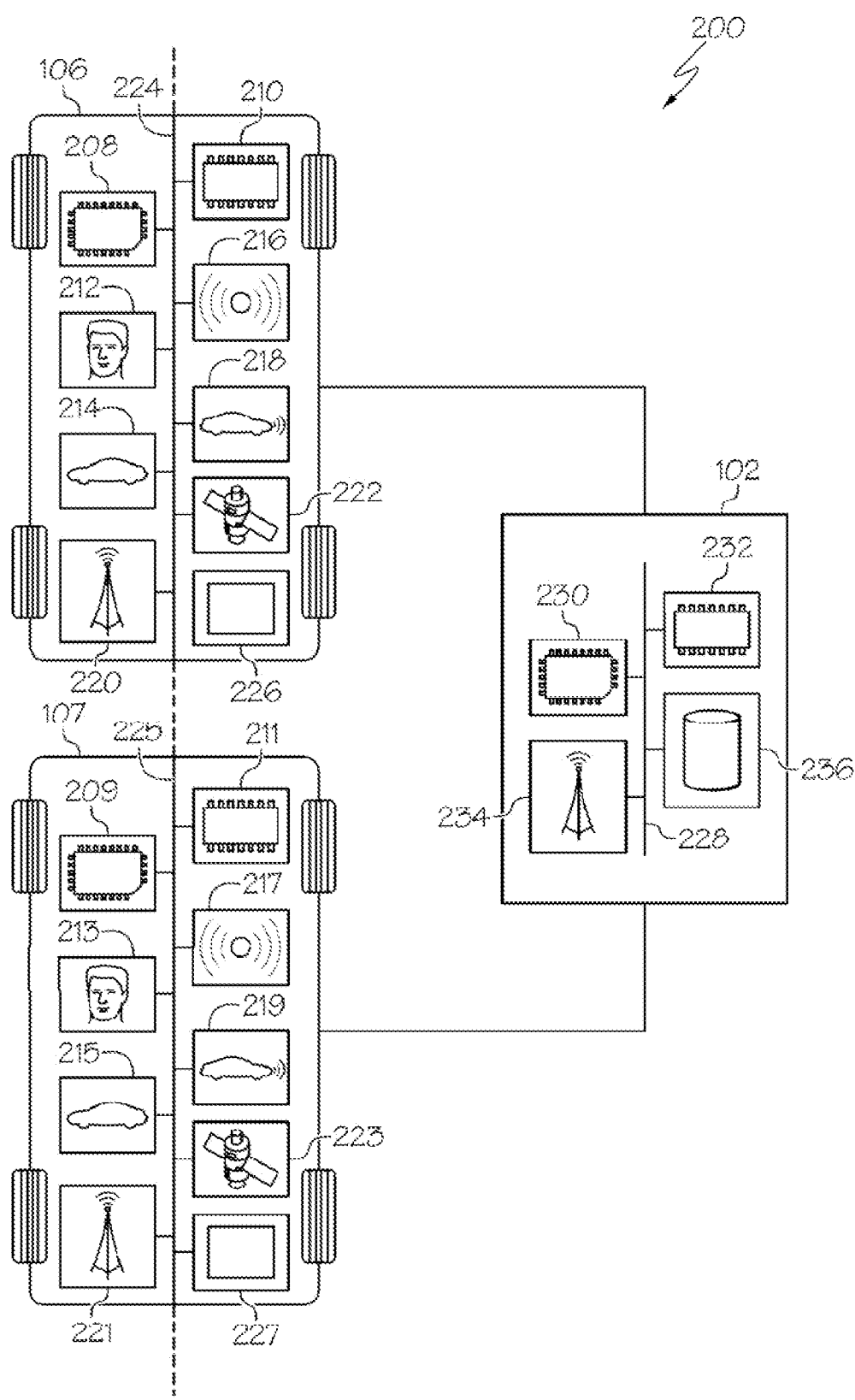
FIG. 2 depicts a schematic diagram of an example system, according to one or more embodiments shown and described herein.

Referring now to FIG. 2, a schematic diagram of an example system 200 is depicted. In particular, two connected vehicles 106 and a server 102 are depicted. The connected vehicle 106 may include a processor component 208, a memory component 210, a user gaze monitoring component 212, a driving assist component 214, a sensor component 216, a vehicle connectivity component 218, a network connectivity component 220, a satellite component 222, and an interface 226. The connected vehicle 106 also may include a communication path 224 that communicatively connects the various components of the connected vehicle 106.

The processor component 208 may include one or more processors that may be any device capable of executing machine readable and executable instructions. Accordingly, each of the one or more processors of the processor component 208 may be a controller, an integrated circuit, a microchip, or any other computing device. The processor component 208 is coupled to the communication path 224 that provides signal connectivity between the various components of the connected vehicle. Accordingly, the communication path 224 may communicatively couple any number of processors of the processor component 208 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 224 may be formed from any medium that is capable of transmitting a signal such as, e.g., conductive wires, conductive traces, optical waveguides, and the like. In some embodiments, the communication path 224 may facilitate the transmission of wireless signals, such as Wi-Fi, Bluetooth®, Near-Field Communication (NFC), and the like. Moreover, the communication path 224 may be formed from a combination of mediums capable of transmitting signals. In one embodiment, the communication path 224 comprises a combination of conductive traces, conductive wires, connectors, and buses that cooperate to permit the transmission of electrical data signals to components such as processors, memories, sensors, input devices, output devices, and communication devices. Accordingly, the communication path 224 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 210 is coupled to the communication path 224 and may contain one or more memory modules comprising RAM, ROM, flash memories, hard drives, or any device capable of storing machine readable and executable instructions such that the machine readable and executable instructions can be accessed by the processor component 208. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory component 210. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The connected vehicle 106 may also include a user gaze monitoring component 212. The gaze monitoring component 212 may include imaging sensors such as a camera or an infrared (IR) blaster. The data gathered by the gaze monitoring component 212 may be analyzed by the processor component 208 to determine whether the direction of the user's gaze is in the direction of the motion of the connected vehicle 106 or elsewhere. This analysis may be based on the user's head position, eye position, etc. In some embodiments, the connected vehicle 106 may transmit the data gathered by the gaze monitoring component 212 to the server 102, and the processor 230 of the server 102 may analyze the data to determine whether the direction of the user's gaze is in the direction of the motion of the connected vehicle 106 or elsewhere.

The connected vehicle 106 may also include a driving assist component 214, and the data gathered by the sensor component 216 may be used by the driving assist component 214 to assist the navigation of the vehicle. The data gathered by the sensor component 216 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The information exchanged between vehicles may include information about a vehicle's speed, heading, acceleration, and other information related to a vehicle state.

The connected vehicle 106 also comprises the sensor component 216. The sensor component 216 is coupled to the communication path 224 and communicatively coupled to the processor component 208. The sensor component 216 may include, e.g., LiDAR sensors, RADAR sensors, optical sensors (e.g., cameras), laser sensors, proximity sensors, location sensors (e.g., GPS modules), and the like. In embodiments, the sensor component 216 may monitor the surroundings of the vehicle and may detect other vehicles and/or traffic infrastructure.

The connected vehicle 106 also comprises a network connectivity component 220 that includes network interface hardware for communicatively coupling the vehicle 106 to the server 102. The network connectivity component 220 can be communicatively coupled to the communication path 224 and can be any device capable of transmitting and/or receiving data via a network or other communication mechanisms. Accordingly, the network connectivity component 220 can include a communication transceiver for sending and/or receiving any wired or wireless communication. For example, the network interface hardware of the network connectivity component 220 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The connected vehicle 106 also comprises a vehicle connectivity component 218 that includes network interface hardware for communicatively coupling the vehicle 106 to other connected vehicles. The vehicle connectivity component 218 can be communicatively coupled to the communication path 224 and can be any device capable of transmitting and/or receiving data via a network or other communication mechanisms. Accordingly, the vehicle connectivity component 218 can include a communication transceiver for sending and/or receiving any wired or wireless communication. For example, the network interface hardware of the vehicle connectivity component 218 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The connected vehicle 106 may connect with one or more other connected vehicles and/or external processing devices (e.g., the server 102) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A satellite component 222 is coupled to the communication path 224 such that the communication path 224 communicatively couples the satellite component 222 to other modules of the connected vehicle 106. The satellite component 222 may comprise one or more antennas configured to receive signals from global positioning system satellites. Specifically, in one embodiment, the satellite component 222 includes one or more conductive elements that interact with electromagnetic signals transmitted by global positioning system satellites. The received signal is transformed into a data signal indicative of the location (e.g., latitude and longitude) of the satellite component 222, and consequently, the connected vehicle 106.

The connected vehicle 106 may also include a data storage component that may be included in the memory component 210. The data storage component may store data used by various components of the connected vehicle 106. In addition, the data storage component may store data gathered by the sensor component 216, received from the server 102, and/or received from other vehicles.

The connected vehicle 106 may also include an interface 226. The interface 226 may allow for data to be presented to a human driver and for data to be received from the driver. For example, the interface 226 may include a screen to display information to a driver, speakers to present audio information to the driver, and a touch screen that may be used by the driver to input information. In other examples, the connected vehicle 106 may include other types of interfaces 226. The interface may output information that the connected vehicle 106 received from the server 102. For example, the interface 226 may display instructions to turn on CACC from the server 102 such that the driver of the connected vehicle 106 understands that CACC is turned on per the instructions from the server 102.

In some embodiments, the connected vehicle 106 may be communicatively coupled to the server 102 by a network. The network may be a wide area network, a local area network, a personal area network, a cellular network, a satellite network, and the like.

Another vehicle 107 may comprise the same or similar components as connected vehicle 106. The other vehicle 107 may include a processor component 209, a memory component 211, a user gaze monitoring component 213, a driving assist component 215, a sensor component 217, a vehicle connectivity component 219, a network connectivity component 221, a satellite component 223, a user interface component 227, and a communication path 225. The other connected vehicle 107 may be communicatively connected to the server 102 by a network as well as to other connected vehicles such as the connected vehicle 106. Multiple connected vehicles 106 and 107 can combine to form an ad hoc network with peer-to-peer information sharing abilities. This would obviate the use of a server 102 to externally manage autonomous path planning and thus keep calculations local and between the connected vehicles 106 and 107.

In scenarios such as FIG. 4 below, a connected vehicle 106 may share information about itself and its surroundings (including surrounding vehicles) to other connected vehicles, such as the connected vehicle 107. A connected vehicle 106 may also aggregate information about other vehicles and their surroundings to process locally or to send to a server 102 for processing.

The server 102 comprises a processor 230, a memory component 232, a network connectivity component 234, a data storage component 236, and a communication path 228. Each server component is similar in features to its connected vehicle counterpart, described in detail above.

Figure 3:
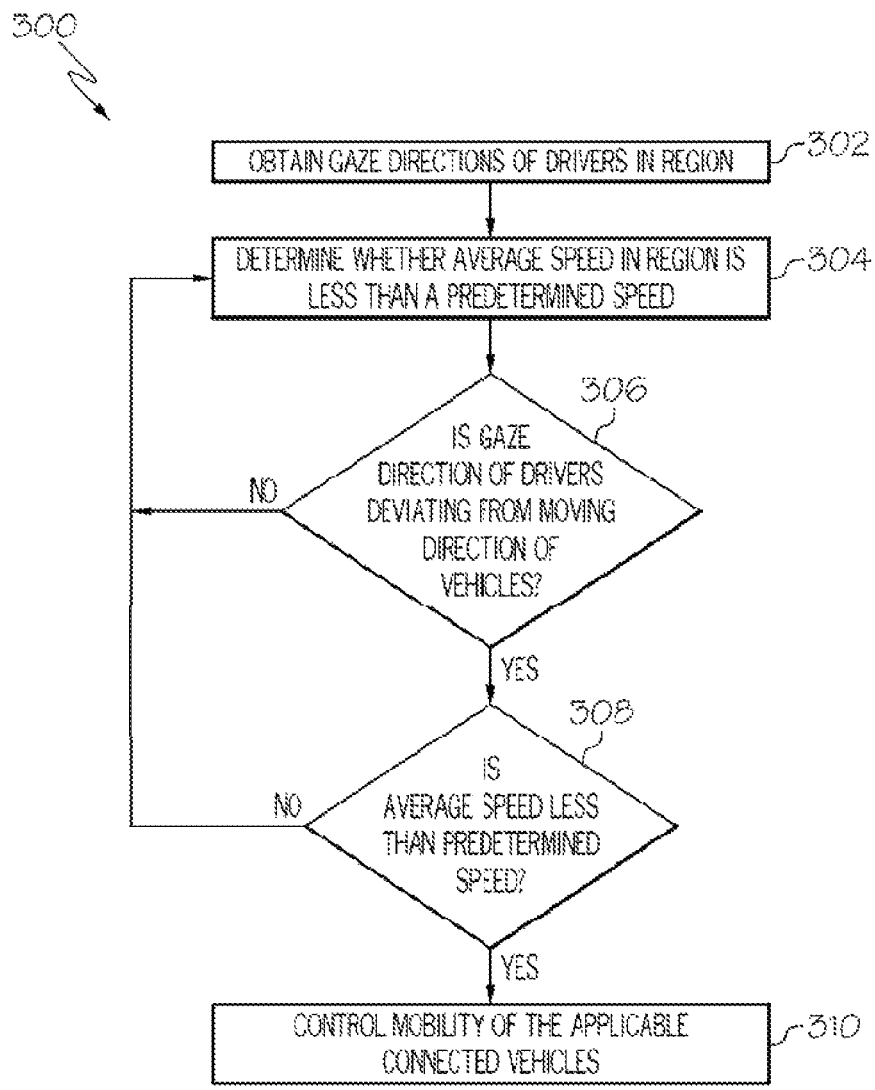
FIG. 3 depicts a flowchart of an example method, according to one or more embodiments shown and described herein.

Referring now to FIG. 3, a flowchart of an example method for autonomous path planning 300 is depicted. The flowchart 300 is described by referring to FIG. 2. At step 302, the gaze directions of drivers of connected vehicles in the rubbernecking region is obtained. Gaze direction may be determined via the gaze monitoring component 212 of connected vehicles 106. The gaze direction may be stored in the data component of the connected vehicle 106 that made the determination or in the data storage component 236 of the server 102.

At step 304, the average speed of vehicles in the rubbernecking region 112 is determined and compared against a predetermined speed. In one example, the predetermined speed may be a speed lower than a normal speed on the road. For example, if the average speed of the vehicles on the road without traffic is 40 miles per hour, the predetermined speed may be set as 35 miles, 30 miles, or less. In another example, the predetermined speed may be set as a speed lower than the speed limit of the load by a certain amount. For example, if the speed limit is 50 miles per hour, the predetermined speed may be set as 35 miles per hour. In another example, the predetermined speed is a lower speed limit of the road. For example, if the upper speed limit is 65 miles per hour and the lower speed limit is 40 miles per hour, the predetermined speed may be set as 40 miles per hour.

Vehicle speed can be determined by the sensor component 216 of the connected vehicles 106. The speed data can be stored and/or shared between the connected vehicles 106 and/or the server 102. The connected vehicles 106 and/or server 102 having the speed data can then calculate the average speed of the connected vehicles 106. The average speed is compared against the predetermined speed of the road, which may have been stored on the connected vehicle 106 and/or server 102 in advance or determined on the fly by the sensor component 216 of the connected vehicle 106.

At step 306, the condition of whether the gaze directions of the drivers of connected vehicles 106 are deviating from the moving direction of traffic is evaluated. This may be based on a pre-determined threshold or ratio of drivers in the rubbernecking region 112. This condition may also be based on a dynamically determined threshold or ratio of drivers in the rubbernecking region 112 that is itself based on traffic conditions, such as, e.g., the density of congestion. If the number of drivers that are deviating their gaze is not above the threshold, then the process goes back to step 302. If the number of drivers that are deviating their gaze is above the threshold, then the process goes to step 308.

At step 308, the condition of whether the average speed of the drivers in the rubbernecking region 112 are slower than the predetermined speed is evaluated. If the average speed is not below the predetermined speed, then the process goes back to step 302. If the average speed is below the predetermined speed, then the process goes to step 310. Some embodiments may require a threshold amount difference between the predetermined speed and the average speed for the process to proceed.

At step 310, a command is issued to the connected vehicles 106 to control their mobility. The command may be any command that controls the mobility of the connected vehicles 106 such as modifying the level of autonomous driving, activating ACC/CACC, changing lanes, etc. to keep the flow of traffic moving, despite the rubbernecking drivers.

The command may be issued by the server 102 or by a connected vehicle 106 in the rubbernecking region 112. A command issued by the server 102 operates on a client-server model where a command originates from the server and may go directly to each connected vehicle in the rubbernecking region 112. A command issued by a connected vehicle 106 may be issued by the vehicle connectivity component 218 of a connected vehicle 106 to another connected vehicle 107 in V2V communication. A command issued by a connected vehicle 106 may operate on a peer-to-peer model such that the command is shared among connected vehicles 106 who will share with other connected vehicles 107 in the rubbernecking region 112.

Referring now to FIG. 4, a scenario 400 where a connected vehicle reports traffic conditions and a server directs connected vehicles in a rubbernecking region to activate CACC/ACC is depicted. Particularly, FIG. 4 illustrates a bidirectional roadway where one direction of traffic contains a distracting event 104 resulting in several drivers of the opposing direction with gazes that deviate 402 towards the event 104. This further results in a speed calculation 406 of less than the roadway's predetermined speed 408. A speed calculation 406 may be a calculation of the average speed in a rubbernecking region 112 as calculated by one or more connected vehicles 106. This calculation may be performed in ways such as vehicles monitoring the speed of surrounding vehicles, gathering speed information reported by other connected vehicles 106 via their vehicle connectivity component 218, requesting speed information from traffic infrastructure monitoring vehicle speed, etc.

Connected vehicles 106 in the congestion region 114 may determine whether there is non-recurring congestion, monitor the traffic condition, and activate the system. Connected vehicles 106 in the rubbernecking region 112 may report their gaze status to one another or may report it to the server 102 directly. Connected vehicles 106 in the rubbernecking region 112 may report their speed and the predetermined speed 408 to one another or may report it to the server 102 directly. In some embodiments, the server 102 may already know the predetermined speed based on the connected vehicle's 106 location.

In FIG. 4, the connected vehicles 106 in the congestion region 114 determined there is a non-recurring congestion, thereby triggering the activation of the system. Non-recurring congestion is a form of congestion that occurs due to an irregular event (e.g., accidents, construction, emergencies, etc.), as opposed to recurring congestion, commonly known as "rush hour" traffic. Once the system is activated, each of the connected vehicles 106 in the rubbernecking region 112 may determine their speed and driver gaze status. Each of the connected vehicles 106 may report this information to each other and/or to the server 102.

One or more of the connected vehicles 106 may gather the speed data of the other connected vehicles 106 in the rubbernecking region 112 and perform a speed calculation 406 to find the average speed, which is 40 miles per hour in this case. One or more of the connected vehicles 106 with the gaze and average speed data send that data in the form of a status update 410 to the server 102.

The server 102 evaluates the conditions of whether the number of drivers whose gaze direction is deviating from the moving direction of their vehicles is beyond a threshold value and whether the average speed is less than a predetermined speed and decides to issue a vehicle command 412 to the connected vehicles 106 in the rubbernecking region 112. In some embodiments, one or more of the connected vehicles 106 in the rubbernecking region 112 may evaluate the conditions and issue the appropriate command themselves via V2V communication. The connected vehicles 106 in the rubbernecking region 112 respond to the vehicle command 412 accordingly. Connected vehicles 106 outside of the rubbernecking region 112 are unaffected.

Figure 5:
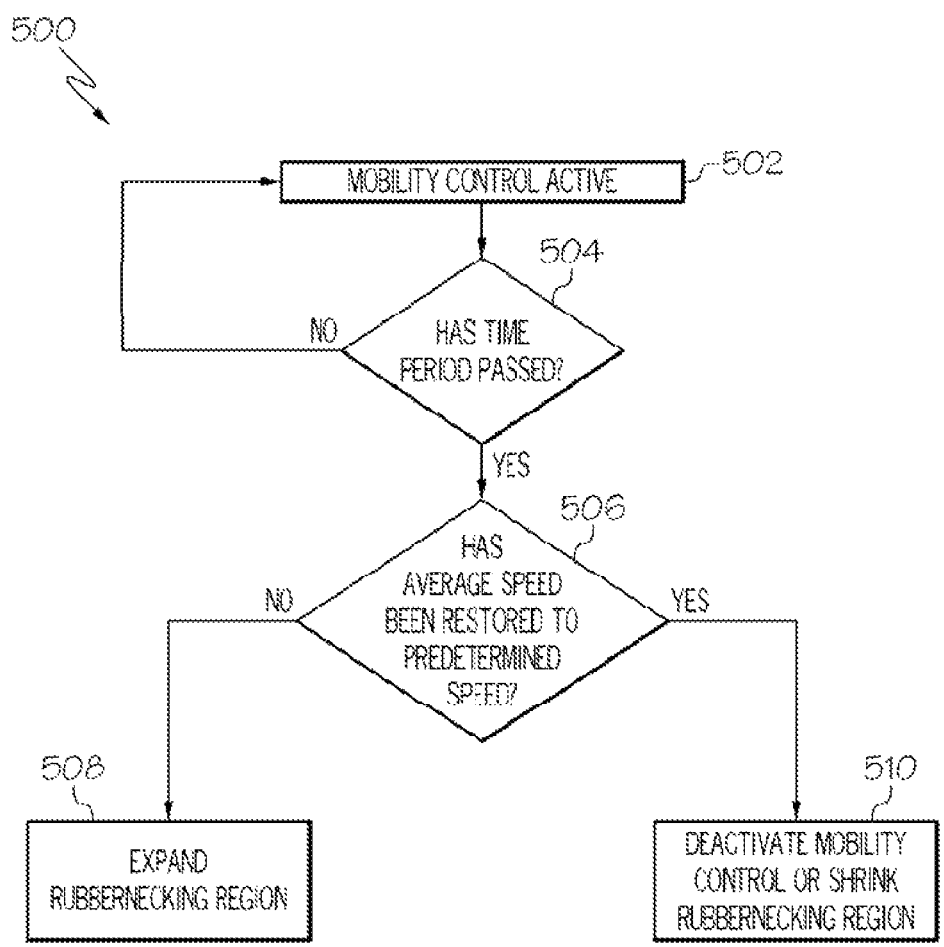
FIG. 5 depicts a flowchart of continuing or terminating an example method, according to one or more embodiments shown and described herein.

Referring now to FIG. 5, a flowchart 500 of continuing or terminating an example method is depicted. After a command (e.g., CACC activation command) has been issued to control the mobility of connected vehicles 106 to mitigate traffic congestion created by rubbernecking, the method may determine whether the traffic congestion has in fact been mitigated. The flowchart is described by referring to FIG. 4.

At step 502, one or more commands have been issued to control the mobility of the connected vehicles 106 in the rubbernecking region 112. In embodiments, the command is issued to the connected vehicles 106 to control their mobility. The command may be issued by the server 102 or by one of the connected vehicles 106 in the rubbernecking region 112. The command may be any command that controls the mobility of the connected vehicles 106 such as modifying the level of autonomous driving, activating ACC/CACC, changing lanes, etc. to keep the flow of traffic moving, despite the rubbernecking drivers.

At step 504, it is determined whether a time period longer than a predetermined time period has passed. When a command is issued to activate mobility control, the issuer (e.g., server 102, connected vehicle 106, etc.) may begin a timer for a time period. For example, previously at step 310, the server 102 may have issued a command such as the vehicle command 412 to activate CACC/ACC. Based on the status update 410, the server 102 calculates that this command should remain in effect for 15 minutes, after such time the status of the rubbernecking region 112 may be re-evaluated.

Additionally or alternatively, the command itself may have a lifespan timer. This way, when the command is issued to each connected vehicle 106, each connected vehicle knows how long to follow the command. For example, previously at step 310, a connected vehicle 106 may have determined that the conditions in steps 306 and 308 are satisfied such that a command should be issued to the other connected vehicles 106. However, the connected vehicle 106 the command originates from may no longer be in the rubbernecking region after the timer is over, and thus would not be able to have further communications with the vehicles in the rubbernecking region 112. Therefore, the command may have a lifespan timer of a length of time based on the traffic conditions of the rubbernecking region 112, so that when the lifespan timer of the command is done another connected vehicle 106 in the rubbernecking region 112 may re-evaluate the traffic conditions.

The time period for the timer or lifespan may be fixed or it may be dynamic based on factors such as estimated duration of traffic congestion. Once the timer has ended, the process may move to step 506.

Still at step 504, if it is determined the time that has passed is not longer than the predetermined time period, then the process goes back to step 502. If it is determined the time that has passed is longer than the predetermined time period, then the process goes to step 506 and the connected vehicles 106 in the rubbernecking region 112 keep operating according to the issued mobility control command. For example, if the server 102 set a timer for 15 minutes after issuing a vehicle command 412 at step 310, the server will not re-evaluate traffic conditions in step 506 until the timer is done. If there is no server 102 and a command with a lifespan timer of 15 minutes has previously been issued, a connected vehicle 106 in the rubbernecking region 112 will not re-evaluate traffic conditions in step 506 until the command's lifespan timer is done.

At step 506, the condition of whether the average speed has been restored to the predetermined speed or faster is evaluated. In one example, the predetermined speed may be a speed lower than a normal speed on the road. In another example, the predetermined speed may be set as a speed lower than the speed limit of the load by a certain amount. In another example, the predetermined speed is a lower speed limit of the road. If the traffic conditions have not restored to the predetermined speed or faster, then the process moves to step 508 where the rubbernecking region is expanded. If the traffic conditions have restored to the predetermined speed or faster, then the process moves to step 510 where a command to deactivate mobility control or shrink the rubbernecking region 112 is issued to the connected vehicles 106 in the rubbernecking region 112. For example, previously at step 310, the server 102 may have issued a command such as 412 to activate CACC/ACC. Based on the status update 410, the server 102 calculates that this command should remain in effect for 15 minutes. After 15 minutes have passed, the server may request more information from the connected vehicles 106 in the rubbernecking region 112 to compare to the predetermined speed. If the traffic conditions have not restored to the predetermined speed, then the server 102 may take further measures to improve congestion in the rubbernecking region 112 such as expanding the rubbernecking region 112 so that more cars are affected by the server's commands and/or issuing new/ continuing commands to the connected vehicles 106 of the rubbernecking region 112. New actions may be accompanied with a reset timer to check the efficacy of the new actions in the future.

Figure 6:
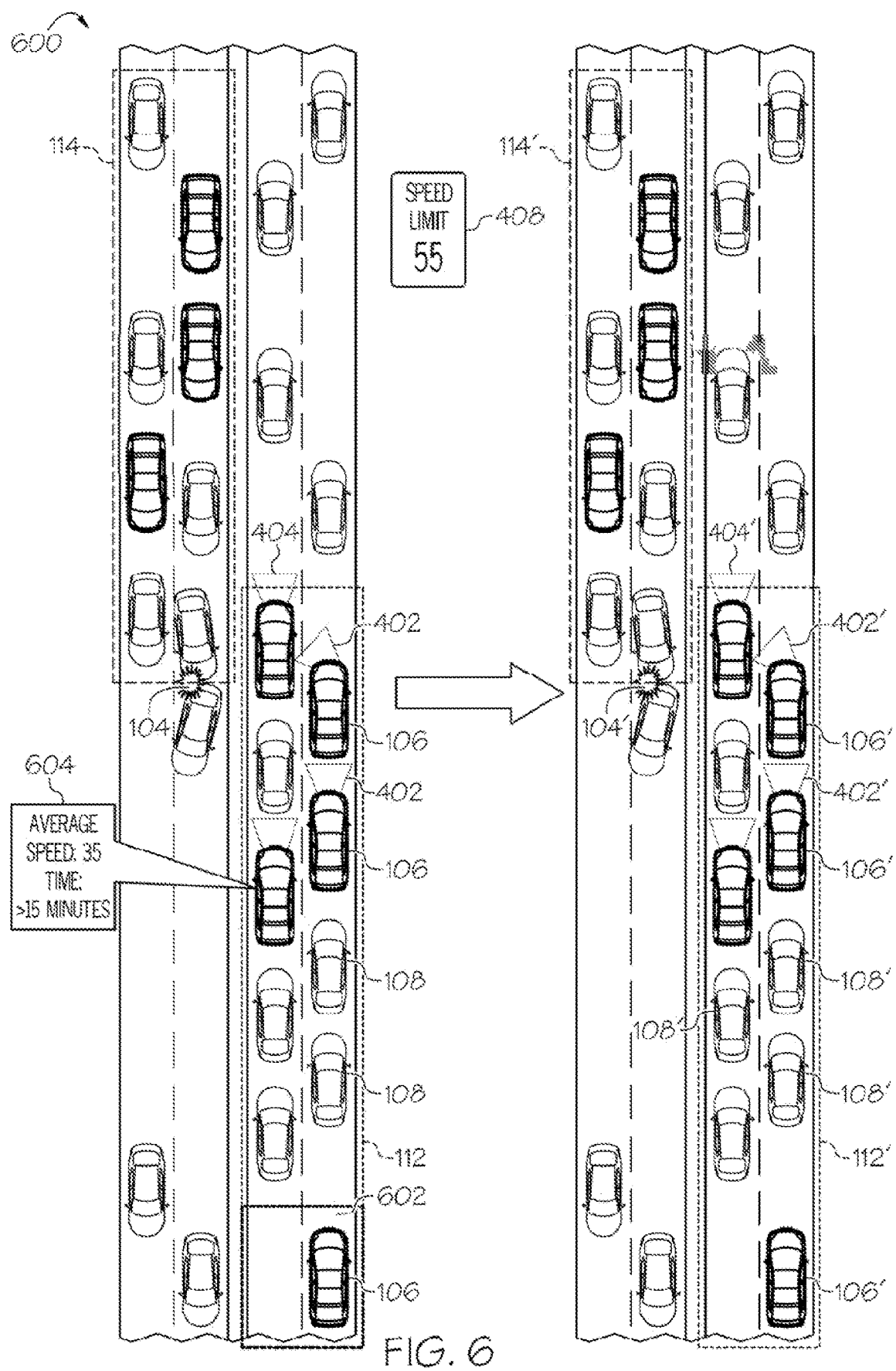
FIG. 6 depicts a connected vehicle reporting traffic conditions and a server expanding the rubbernecking zone accordingly, according to one or more embodiments shown and described herein.

Referring now to FIG. 6, a scenario 600 where a connected vehicle 106 reports traffic conditions and a server 102 expands the rubbernecking zone accordingly is depicted. The situation depicted is similar to that of FIG. 4; however, a vehicle command has been issued, yet traffic congestion has not improved neither has the degree of rubbernecking taking place in the rubbernecking region 112. Also like the scenario depicted in FIG. 4, connected vehicles 106 in the rubbernecking region 112 may report their gaze status to one another or may report it to the server 102 directly. Connected vehicles 106 in the rubbernecking region 112 may report their speed and the predetermined speed 408 to one another or may report it to the server 102 directly. In some embodiments, the server 102 may already know the predetermined speed based on the connected vehicle's 106 location. In some embodiments, the server 102 may perform the calculations discussed with the information reported from the connected vehicles 106.

In scenario 600, one of the connected vehicles 106 in the rubbernecking region calculated the average speed of the vehicles in the rubbernecking region 112, which is 35 miles per hour in this case. One or more connected vehicles 106 may contain the gaze data of the connected vehicles 106 and average speed of the rubbernecking region 112. Additionally, one or more connected vehicles 106 may send that data in the form of a status update 604 to the server 102.

The server 102 determines whether the appropriate time period has passed and determines an area of an expanded rubbernecking region 602. In some embodiments, one or more of the connected vehicles 106 in the rubbernecking region 112 may evaluate the conditions and determine the expanded rubbernecking region 602 themselves via V2V communication. The expanded rubbernecking region 602 may be a region of a predefined size.

For example, the initial rubbernecking region 112 may be 1 mile long and an expanded rubbernecking region 602 and subsequent expansions may be in ¼ mile increments. The expanded rubbernecking region 602 may alternatively be the distance between the last connected vehicle 106 of a rubbernecking region 112 and the next connected vehicle 106 outside of the rubbernecking region 112. For example, the initial rubbernecking region 112 is 1 mile long and the next connected vehicle 106 is 1 mile behind the rubbernecking region 112. In this case, the expanded rubbernecking region 602 would be 1 mile to include the next connected vehicle 106, for a total length of 2 miles for rubbernecking region 112. A cap value may be utilized to prevent the rubbernecking region 112 from expanding to unworkable distances.

The connected vehicles 106 in the rubbernecking region 112 may be unaffected since they already are in the rubbernecking region. Connected vehicles 106 outside of the rubbernecking region 112 are now affected by prior and/or subsequent mobility control commands because they are now in the rubbernecking region 112.

Figure 7:
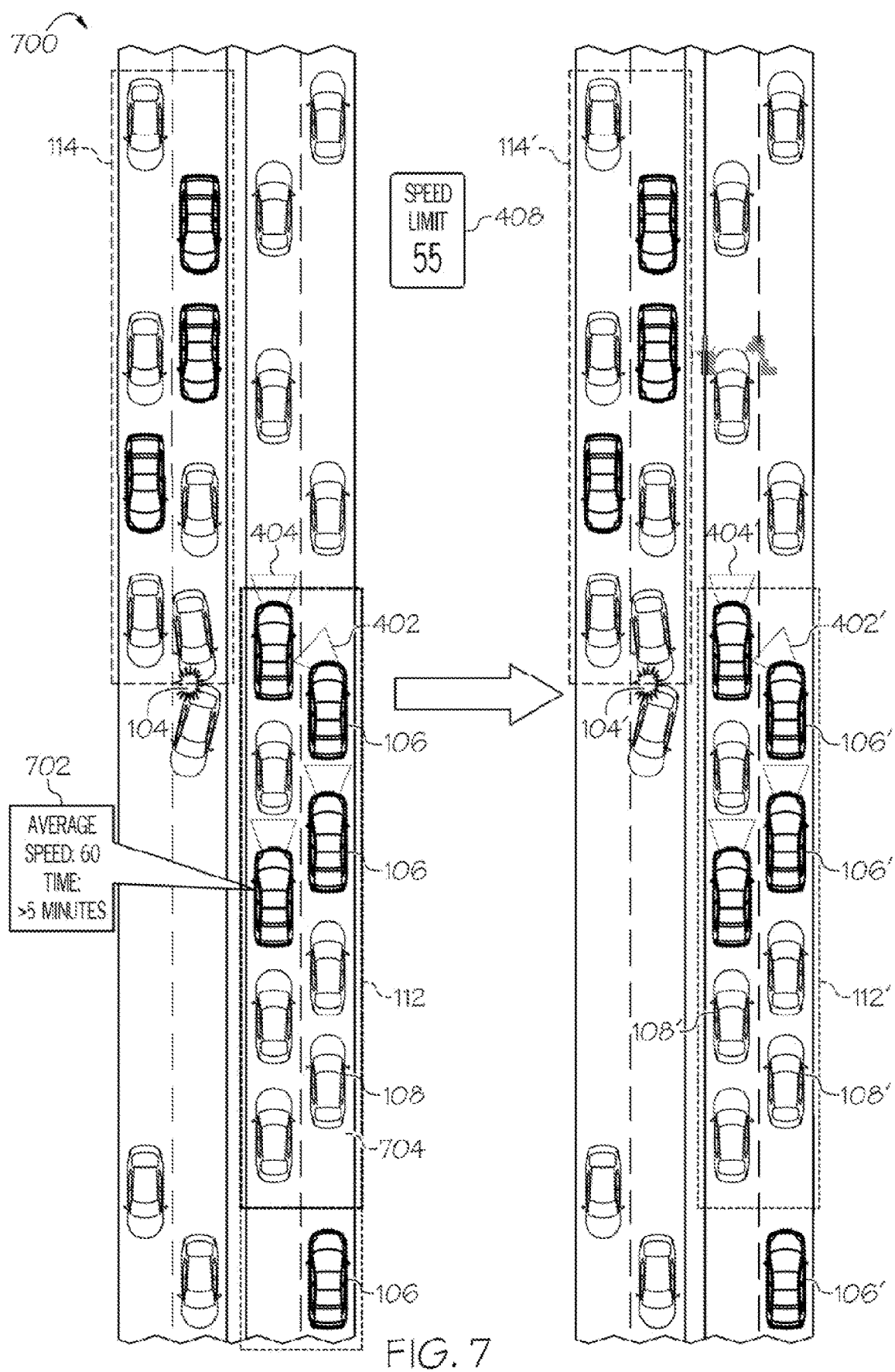
FIG. 7 depicts a connected vehicle reporting traffic conditions and a server shrinking the rubbernecking zone accordingly, according to one or more embodiments shown and described herein.

Referring now to FIG. 7, a scenario 700 where a connected vehicle reports traffic conditions and a server shrinks the rubbernecking zone accordingly is depicted. The situation depicted is similar to that of scenario 600; however, a vehicle command has been issued and traffic congestion has improved as has the degree of rubbernecking taking place in the rubbernecking region 112. Also like the scenario 600, connected vehicles 106 in the rubbernecking region 112 may report their gaze status to one another or may report it to the server 102 directly. Connected vehicles 106 in the rubbernecking region 112 may report their speed and the predetermined speed 408 to one another or may report it to the server 102 directly. In some embodiments, the server 102 may already know the predetermined speed based on the connected vehicle's 106 location. In some embodiments, the server 102 may perform the calculations discussed with the information reported from the connected vehicles 106.

In scenario 700, one of the connected vehicles 106 calculated the average speed of the rubbernecking region 112, which is 60 miles per hour in this case. One or more of the connected vehicles 106 with the gaze data of the connected vehicles 106 and average speed data send that data as a status update 702 to the server 102.

The server 102 determines whether the appropriate time period has passed and determines an area of a shrunk rubbernecking region 704. In some embodiments, one or more of the connected vehicles 106 in the rubbernecking region 704 may evaluate the conditions and determine the shrunk rubbernecking region 704 themselves via V2V communication. Connected vehicles 106 in the rubbernecking region 704 are now unaffected by prior and subsequent mobility control commands because they are no longer in the rubbernecking region 112.

For example, the initial/current rubbernecking region 112 is 1 mile long and a shrunk rubbernecking region 704 and subsequent shrinking may be in ¼ mile increments. The shrunk rubbernecking region 704 may also be the distance between the last connected vehicle 106 of a rubbernecking region 112 and the next connected vehicle 106 inside of the rubbernecking region 112. For example, the initial rubbernecking region 112 is 2 miles long and the next connected vehicle 106 is 1 mile ahead of the end of the rubbernecking region 112, in which case the shrunk rubbernecking region 704 would be 1 mile.

Referring now to FIG. 8, a scenario 800 where a connected vehicle reports traffic conditions and a server directs connected vehicles in a rubbernecking region to change lanes is depicted. Particularly, FIG. 8 illustrates a bidirectional roadway where one direction of traffic contains a distracting event 104 resulting in drivers of the opposing direction with gazes that deviate 402 towards the event 104. Connected vehicles 106 in the rubbernecking region 112 may report their gaze status to one another or may report it to the server 102 directly. Connected vehicles 106 in the rubbernecking region 112 may report open lanes around them to one another or may report it to the server 102 directly.

In scenario 800, one or more of the connected vehicles 106 determine that the right lane has less congestion than the left lane. One or more connected vehicles 106 may contain the gaze data of the connected vehicles 106 and lane congestion data of the rubbernecking region. Additionally, one or more connected vehicles 106 may send that data in the form of a status update 802 to the server 102.

The server 102 evaluates the conditions of whether number of drivers whose gaze direction is deviating from the moving direction of their vehicles is beyond a threshold value and whether the average speed is less than a predetermined speed and decides to issue a vehicle command 804 to the connected vehicles 106 in the rubbernecking region 112, in this case to change lanes into the less congested lane. In some embodiments one or more of the connected vehicles 106 in the rubbernecking region 112 may evaluate the conditions and issue the appropriate command themselves via V2V communication. The connected vehicles 106 in the congested left lane respond to the vehicle command 804 accordingly and move to the right lane. A connected vehicle 106 outside of the rubbernecking region 112 is unaffected.

It should now be understood that embodiments described herein are directed to methods and systems for autonomous path planning triggered by freeway rubbernecking. Connected vehicles in a rubbernecking region of a roadway nearing a distracting event monitor the gaze of the drivers and surrounding traffic conditions. If the amount of rubbernecking is significant and traffic condition is degrading, then a server may direct the connected vehicles in the rubbernecking region to activate intelligent vehicle systems to maintain the flow of traffic. This may cause the vehicles to activate autonomous driving capabilities, ACC/CACC capabilities, lane change capabilities, and the like.

After a period of time has passed, if the amount of rubbernecking or the traffic conditions have not improved, the system may direct the rubbernecking region to expand to potentially include more connected vehicles. If, however, the amount of rubbernecking or the traffic conditions have improved, the system may direct the rubbernecking region to shrink to potentially include fewer connected vehicles. The system may also direct connected vehicles in the rubbernecking region to resume normal operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling vehicle traffic, the method comprising:
    obtaining gaze directions of drivers of a plurality of connected vehicles in a region of a road;
    determining whether an average speed of the plurality of connected vehicles in the region is less than a predetermined speed;
    expanding the region in response to determining that the average speed of the plurality of connected vehicles is less than the predetermined speed;
    transmitting one or more commands that includes a lifespan timer whose time period is dynamic and based on an estimated duration of traffic congestion, the one or more commands including controlling mobility of one or more of the plurality of connected vehicles in response to determining that the gaze directions of one or more drivers of the plurality of connected vehicles deviate from a moving direction of the plurality of connected vehicles and determining that the average speed of the plurality of connected vehicles is less than the predetermined speed;
    determining whether a time period of controlling mobility of one or more of the plurality of connected vehicles has passed a predetermined time period, wherein the predetermined time period starts at beginning of controlling the mobility of one or more of the plurality of connected vehicles;
    keep controlling the mobility of one or more of the plurality of connected vehicles in response to determining that the predetermined time period of controlling mobility of one or more of the plurality of connected vehicles has not passed the predetermined time period; and
    determining whether the average speed of the plurality of connected vehicles in the region has been restored to the predetermined speed in response to determining that the predetermined time period of controlling the mobility of one or more of the plurality of connected vehicles has passed the predetermined time period,
    wherein controlling the mobility of the one or more of the plurality of connected vehicles comprises activating autonomous driving capabilities, automatic cruise control or cooperative automatic cruise control, or lane change capabilities of the one or more of the plurality of connected vehicles, and
    wherein upon expiration of the lifespan timer, a second of the plurality of connected vehicles re-evaluates traffic conditions for the traffic congestion.

2. The method of claim 1, further comprising:
    controlling mobility of one or more connected vehicles approaching the region in response to determining that the gaze directions of one or more drivers of the plurality of connected vehicles deviate from the moving direction of the plurality of connected vehicles and determining that the average speed of the plurality of connected vehicles is less than the predetermined speed.

3. The method of claim 1, wherein controlling mobility of the one or more of the plurality of connected vehicles comprises instructing the one or more of the plurality of connected vehicles to change lanes.

4. The method of claim 1, wherein controlling mobility of the one or more of the plurality of connected vehicles comprises adjusting a level of autonomy of the one or more of the plurality of connected vehicles.

5. The method of claim 1, wherein controlling mobility of the one or more of the plurality of connected vehicles comprises adjusting speed or acceleration of the one or more of the plurality of connected vehicles.

6. The method of claim 1, further comprising:
determining whether the gaze directions of the one or more drivers of the plurality of connected vehicles are toward a location of an incident.

7. The method of claim 1, further comprising:
identifying a number of drivers whose gaze directions deviate from the moving direction of the plurality of connected vehicles; and
controlling mobility of one or more of the plurality of connected vehicles in response to determining that the number of drivers whose gaze directions deviate from the moving direction of the plurality of connected vehicles is greater than a predetermined value and determining that the average speed of the plurality of connected vehicles is less than the predetermined speed.

8. The method of claim 1, further comprising:
receiving a location of an incident; and
controlling mobility of one or more of the plurality of connected vehicles in response to determining that the gaze directions of one or more drivers of the plurality of connected vehicles are toward the location of the incident and determining that the average speed of the plurality of connected vehicles is less than the predetermined speed.

9. The method of claim 1, further comprising:
determining a size of the region based on the average speed of the plurality of connected vehicles in the region.

10. The method of claim 1, wherein obtaining the gaze directions of drivers of the plurality of connected vehicles in the region of the road comprises:
capturing images of the drivers of the plurality of connected vehicles in the region of the road; and
processing the images of the drivers to determine the gaze directions of the drivers of the plurality of connected vehicles.

11. A system comprising:
a controller programmed to:
obtain gaze directions of drivers of a plurality of connected vehicles in a region of a road;
determine whether an average speed of the plurality of connected vehicles in the region is less than a predetermined speed;
expand the region in response to determining that the average speed of the plurality of connected vehicles is less than the predetermined speed;
transmit one or more commands that includes a lifespan timer whose time period is dynamic and based on an estimated duration of traffic congestion, the one or more commands including activating autonomous driving capabilities, automatic cruise control or cooperative automatic cruise control, or lane change capabilities of one or more of the plurality of connected vehicles in response to determining that the gaze directions of one or more drivers of the plurality of connected vehicles deviate from a moving direction of the plurality of connected vehicles and determining that the average speed of the plurality of connected vehicles is less than the predetermined speed;
determine whether a time period of activating autonomous driving capabilities, automatic cruise control or cooperative automatic cruise control, or lane change capabilities of one or more of the plurality of connected vehicles has passed a predetermined time period, wherein the predetermined time period starts at beginning of activating the autonomous driving capabilities, the automatic cruise control or the cooperative automatic cruise control, or the lane change capabilities of one or more of the plurality of connected vehicles;
keep activating mobility of one or more of the plurality of connected vehicles in response to determining that the predetermined time period of activating autonomous driving capabilities, automatic cruise control or cooperative automatic cruise control, or lane change capabilities of one or more of the plurality of connected vehicles has not passed the predetermined time period; and
determine whether the average speed of the plurality of connected vehicles in the region has been restored to the predetermined speed in response to determining that the predetermined time period of activating autonomous driving capabilities, automatic cruise control or cooperative automatic cruise control, or lane change capabilities of one or more of the plurality of connected vehicles has passed the predetermined time period, wherein
upon expiration of the lifespan timer, a second of the plurality of connected vehicles re-evaluates traffic conditions for the traffic congestion.

12. The system of claim 11, wherein the controller is further programmed to:
identify a number of drivers whose gaze directions deviate from the moving direction of the plurality of connected vehicles; and
control mobility of one or more of the plurality of connected vehicles in response to determining that the number of drivers whose gaze directions deviate from the moving direction of the plurality of connected vehicles is greater than a predetermined value and determining that the average speed of the plurality of connected vehicles is less than the predetermined speed.

13. The system of claim 11, wherein the controller is further programmed to:
receive a location of an incident; and
control mobility of one or more of the plurality of connected vehicles in response to determining that the gaze directions of one or more drivers of the plurality of connected vehicles are toward the location of the incident and determining that the average speed of the plurality of connected vehicles is less than the predetermined speed.

14. The system of claim 11, wherein the controller is further programmed to:
determine a size of the region based on the average speed of the plurality of connected vehicles in the region.

15. The system of claim 11, wherein obtaining the gaze directions of drivers of the plurality of connected vehicles in the region of the road comprises:
capturing images of the drivers of the plurality of connected vehicles in the region of the road; and
processing the images of the drivers to determine the gaze directions of the drivers of the plurality of connected vehicles.

16. A non-transitory computer readable medium comprising machine readable instructions that cause a controller to perform at least the following when executed:
obtain gaze directions of drivers of a plurality of connected vehicles in a region of a road;

determine whether an average speed of the plurality of connected vehicles in the region is less than a predetermined speed;

expand the region in response to determining that the average speed of the plurality of connected vehicles is less than the predetermined speed;

transmit one or more commands that includes a lifespan timer whose time period is dynamic and based on an estimated duration of traffic congestion, the one or more commands including activating autonomous driving capabilities, automatic cruise control or cooperative automatic cruise control, or lane change capabilities of one or more of the plurality of connected vehicles in response to determining that the gaze directions of one or more drivers of the plurality of connected vehicles deviate from a moving direction of the plurality of connected vehicles and determining that the average speed of the plurality of connected vehicles is less than the predetermined speed;

determine whether a time period of activating autonomous driving capabilities, automatic cruise control or cooperative automatic cruise control, or lane change capabilities of one or more of the plurality of connected vehicles has passed a predetermined time period, wherein the predetermined time period starts at beginning of activating the autonomous driving capabilities, the automatic cruise control or the cooperative automatic cruise control, or the lane change capabilities of one or more of the plurality of connected vehicles;

keep activating mobility of one or more of the plurality of connected vehicles in response to determining that the predetermined time period of activating autonomous driving capabilities, automatic cruise control or cooperative automatic cruise control, or lane change capabilities of one or more of the plurality of connected vehicles has not passed the predetermined time period; and determine whether the average speed of the plurality of connected vehicles in the region has been restored to the predetermined speed in response to determining that the predetermined time period of activating the autonomous driving capabilities, the automatic cruise control or the cooperative automatic cruise control, or the lane change capabilities of one or more of the plurality of connected vehicles has passed the predetermined time period, wherein upon expiration of the lifespan timer, a second of the plurality of connected vehicles re-evaluates traffic conditions for the traffic congestion.

17. The non-transitory computer readable medium of claim 16, wherein the machine readable instructions further cause the controller to:

identify a number of drivers whose gaze directions deviate from the moving direction of the plurality of connected vehicles; and control mobility of one or more of the plurality of connected vehicles in response to determining that the number of drivers whose gaze directions deviate from the moving direction of the plurality of connected vehicles is greater than a predetermined value and determining that the average speed of the plurality of connected vehicles is less than the predetermined speed.

18. The non-transitory computer readable medium of claim 16, wherein the machine readable instructions further cause the controller to:

receive a location of an incident; and control mobility of one or more of the plurality of connected vehicles in response to determining that the gaze directions of one or more drivers of the plurality of connected vehicles are toward the location of the incident and determining that the average speed of the plurality of connected vehicles is less than the predetermined speed.

19. The non-transitory computer readable medium of claim 16, wherein the machine readable instructions further cause the controller to:

determine a size of the region based on the average speed of the plurality of connected vehicles in the region.

20. The method of claim 1, further comprising:

determining whether the average speed of the plurality of connected vehicles has been restored to the predetermined speed or faster; and deactivating the mobility in response to determining that the average speed of the plurality of connected vehicles has been restored to the predetermined speed or faster.

* * * * *

UNITED STATES PATENT AND TRADEMARK OFFICE
CERTIFICATE OF CORRECTION

| | |
|---|---|
| PATENT NO. | : 12,258,023 B2 |
| APPLICATION NO. | : 17/210798 |
| DATED | : March 25, 2025 |
| INVENTOR(S) | : Baik Hoh et al. |

It is certified that error appears in the above-identified patent and that said Letters Patent is hereby corrected as shown below:

On the Title Page

Item (71), applicant 2, state/province, after "McMaster University, Hamilton", insert --, ON--.

Item (73), assignee 2, state/province, after "McMaster University, Hamilton", insert --, ON--.

In the Specification

In Column 5, Line(s) 25, after "implemented", delete "on" and insert --in--, therefor.

In Column 8, Line(s) 12, delete "load" and insert --road--, therefor.

In Column 8, Line(s) 43, after "112", delete "are" and insert --is--, therefor.

In Column 10, Line(s) 66, delete "load" and insert --road--, therefor.

In Column 11, Line(s) 23, after "accompanied", delete "with" and insert --by--, therefor.

In Column 11, Line(s) 30, delete "neither" and insert --nor--, therefor.

In Column 13, Line(s) 33, delete "condition is" and insert --conditions are--, therefor.

Signed and Sealed this
Twentieth Day of May, 2025

Coke Morgan Stewart
*Acting Director of the United States Patent and Trademark Office*